United States Patent [19]
Herup et al.

[11] Patent Number: 5,154,050
[45] Date of Patent: Oct. 13, 1992

[54] THRUST VECTOR CONTROL USING INTERNAL AIRFOILS

[76] Inventors: Eric J. Herup, 211 Virginia Dr., Warner Robins, Ga. 31093; Milton E. Franke, 5678 Folkstone Dr., Dayton, Ohio 45459; Jerold H. Friddell, 7073 Sandalview Dr., Huber Heights, Ohio 45424

[21] Appl. No.: 627,690

[22] Filed: Dec. 14, 1990

[51] Int. Cl.⁵ .............................. F02K 1/00
[52] U.S. Cl. .......................... 60/230; 60/228; 60/271; 239/265.19
[58] Field of Search .......... 60/228, 230, 271; 239/265.19, 265.37

[56] References Cited

U.S. PATENT DOCUMENTS

| H384 | 12/1987 | Dillinger et al. | 60/230 |
| 2,644,296 | 7/1953 | Sanz et al. | 60/230 |
| 2,694,898 | 11/1954 | Stauff | 239/265.37 |
| 3,201,937 | 8/1965 | McKee | 60/231 |
| 3,229,457 | 1/1966 | Rowe et al. | 239/265.37 |
| 3,371,491 | 3/1968 | Pinter | 239/265.79 |
| 3,486,698 | 12/1969 | Cologna | 60/228 |
| 3,743,184 | 7/1973 | Mancus | 60/230 |

FOREIGN PATENT DOCUMENTS 1208542  2/1960  France ............... 239/265.37

Primary Examiner—Richard A. Bertsch
Assistant Examiner—Michael I. Kocharov
Attorney, Agent, or Firm—Bobby D. Scearce; Donald J. Singer

[57] ABSTRACT

A thrust vectoring exhaust nozzle structure for an engine, such as a ramjet, rocket or turbojet, which generates thrust by expulsion of gaseous fuel combustion products along a thrust axis is described which comprises a generally axisymmetric housing defined along a central thrust axis including a wall structure defining an exhaust duct, and an axially spaced radially inwardly convergent portion, throat and radically outwardly divergent portion, and at least one airfoil disposed on the wall structure of the divergent portion and mounted for rotation about an axis substantially perpendicular to the thrust axis.

6 Claims, 2 Drawing Sheets

5,154,050

THRUST VECTOR CONTROL USING INTERNAL AIRFOILS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to exhaust nozzle structures for engines providing thrust by expulsion of gaseous products of combustion of fuel, and more particularly to a thrust vectoring nozzle structure incorporating small airfoils in the divergent portion of the nozzle exhaust duct for vectoring thrust.

In thrust-producing engines, such as ramjets, rockets and turbojets, the propulsive nozzle cooperates with the combustor of the engine to convert thermal energy of the gaseous combustion products of fuel burned in the combustor to directed kinetic energy (thrust) at the nozzle exit by the expansion of the gases upon discharge.

Thrust vector control in propulsion nozzles for controlling thrust direction is attained in conventional nozzle structures by various means such as aerodynamic fins, ancillary jets, jet vanes, gimbals and secondary fluid injection. In a converging-diverging overexpanded nozzle, secondary fluid injection has been used for vectoring the primary flow. Typically, secondary fluid is introduced in the diverging portion of the nozzle to cause flow separation and uneven pressure distribution in the nozzle resulting in a laterally directed force.

Confined jet thrust vector control nozzles have a reconverging region downstream of the diverging region. The flow leaves the reconverging region through an exit orifice. This configuration allows for large thrust vector angles of about 20°-30°. Supersonic flow at the exit tends to isolate the flow inside the nozzle from ambient conditions.

The invention herein is an exhaust nozzle structure incorporating small airfoils at the walls defining the divergent portion of an axisymmetric converging-diverging reconverging supersonic nozzle to vector the thrust. Vectoring capability to about 30° is attainable with a small loss in total thrust coefficient. In systems where light weight and large steering vector angles are desirable at the expense of thrust coefficient, the invention avoids the tankage and fluid control systems characteristic of confined jet thrust vector control nozzles, and does not have the inherent altitude limitations of, and can produce much greater vector angles than, boundary layer thrust vector control nozzles.

It is therefore a principal object of the invention to provide an improved exhaust nozzle structure for an engine providing propulsive thrust to a vehicle by expulsion of gaseous products of fuel combustion.

It is a further object of the invention to provide a thrust vectoring exhaust nozzle structure.

It is a further object of the invention to provide a thrust vectoring exhaust nozzle structure utilizing small airfoils in the divergent region of the nozzle.

It is yet a further object of the invention to provide a thrust vectoring exhaust nozzle structure for missile steering control.

These and other objects of the invention will become apparent as a detailed description of representative embodiments proceeds.

SUMMARY OF THE INVENTION

In accordance with the foregoing principles and objects of the invention, an improved thrust vectoring exhaust nozzle structure for an engine, such as a ramjet, rocket or turbojet, which generates thrust by expulsion of gaseous fuel combustion products along a thrust axis is described which comprises a generally axisymmetric housing defined along a central thrust axis including a wall structure defining an exhaust duct, and an axially spaced radially inwardly convergent portion, throat and radially outwardly divergent portion, and at least one airfoil disposed on the wall structure of the divergent portion and mounted for rotation about an axis substantially perpendicular to the thrust axis.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
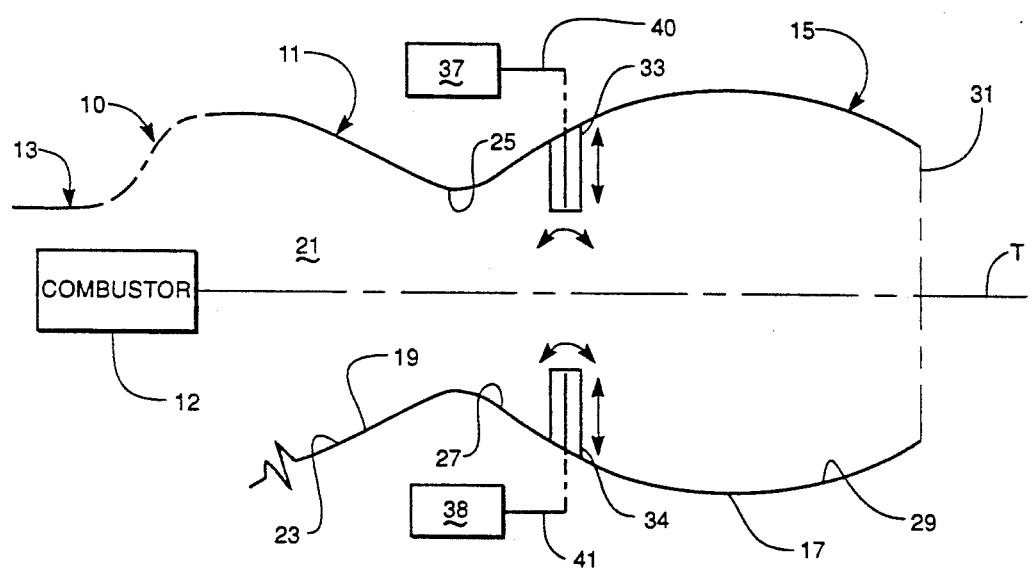
FIG. 1 is a view in axial section of the aft portion of a vehicle illustrating the exhaust region of the engine thereof including a converging-diverging exhaust nozzle structure incorporating the thrust vectoring structure of the invention.

Referring now to the drawings, FIG. 1 is a view in axial section of the aft portion of a vehicle 10 illustrating the thrust/exhaust region 11 and combustor 12 of engine 13 of the type which propels vehicle 10 by producing thrust generally along thrust axis T. Region 11 is defined in part by exhaust nozzle 15 incorporating the thrust vectoring structure of the invention.

The exhaust nozzle structure to which the improvement provided by the invention herein may be most applicable comprises the axisymmetric converging-diverging reconverging supersonic type suggested schematically in FIG. 1, although, as will become apparent hereinbelow, the invention may be applicable to other nozzle types such as the conventional convergent-/divergent type. Accordingly, nozzle 15 may comprise a generally axisymmetric housing 17 defined along a central thrust axis T and may include conventional wall structure 19 defining exhaust duct 21, and an axially spaced radially inwardly convergent portion 23, throat 25, radially outwardly divergent portion 27, reconvergent portion 29 and nozzle discharge plane 31. Convergent portion 23 defines an inlet for nozzle 15 and the compression region of nozzle 15 extending to throat 25. Divergent portion 27 defines the expansion region for nozzle 15 and extends along axis T to reconvergent portion 29.

In accordance with the governing principles of the invention, one or more small airfoils 33,34 (substantially fat protrusions) are inserted through wall structure 19 in divergent portion 27 in the general location indicated in FIG. 1 in order to controllably vector the thrust generated by engine 13 along axis T. The side of wall structure 19 at divergent portion 27 to which gaseous flow attaches (remains substantially undisturbed) determines the direction of any lateral force resulting from the presence and orientation of the airfoils. Airfoils 33, 34 are rotatably mounted with their respective (substantially mutually coincident) axes of rotation which are perpendicular to thrust axis T. The sizing and shape of airfoils 33,34 and the materials of construction thereof may be selected by the skilled artisan guided by these teachings depending upon the operational requirements of the system in which the invention is applied. It is noted, however, that for throat 25 sizes in existing nozzle configurations, projection lengths of airfoils 33, 34 into exhaust duct 21 of about 15 to 35% of throat diameter provide thrust vectoring up to about 30° from thrust axis T. For optimum performance of nozzle 15 improved with airfoils 33,34 according to the invention, the airfoils are located a distance from throat 25 corresponding to about 20 to 25% of the axial extent of divergent portion 27 in existing nozzles.

It is apparent that for many nozzle applications, airfoils 33,34 may be required to withstand high temperatures, for which high temperature resistant ceramics, tungsten/carbon composites or the like may appropriate.

Figure 2A:
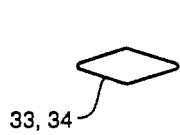
FIGS. 2a,b,c through FIGS. 6a,b,c show respective side and top views in axial section of a nozzle with airfoils of the invention installed diametrically of the divergent portion of the nozzle, along with resultant vectoring of thrust at corresponding airfoil orientations.
Figure 2B:
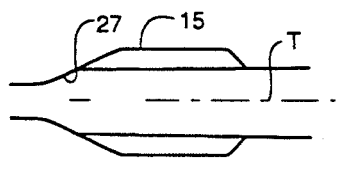
Figure 2C:
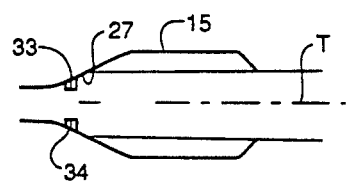
Figure 3A:
Figure 3B:
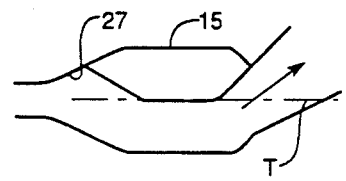
Figure 3C:
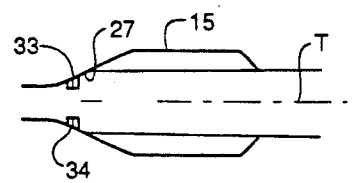
Figure 4A:
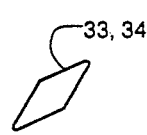
Figure 4B:
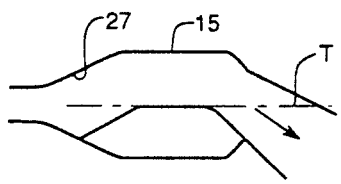
Figure 4C:
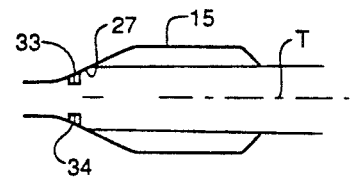
Figure 5A:
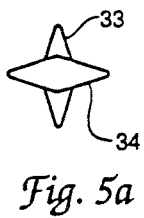
Figure 5B:
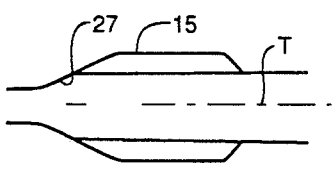
Figure 5C:
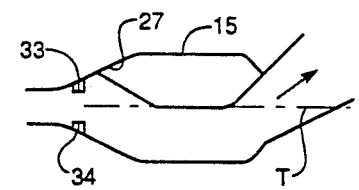
Figure 6A:
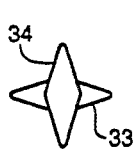
Figure 6B:
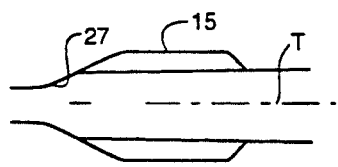
Figure 6C:
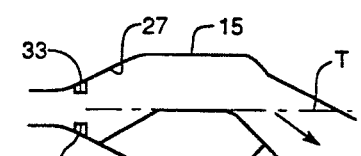

Referring now to FIGS. 2 through 6, shown in FIGS. 2b,c through 6b,c are respective side and top views in axial section of nozzle 15 with airfoils 33,34 installed diametrically of divergent portion 27 (as in FIG. 1), along with resultant vectoring of thrust by airfoils 33,34 at corresponding specified orientations (FIGS. 2a-6a). In FIG. 2, orientations of both airfoils 33,34 are streamlined (FIG. 2c) illustrating in the side view (FIG. 2b) and in the top view (FIG. 2c) that no vectoring of the thrust results. In FIG. 3, airfoils 33,34 have been rotated in one direction to a severe angle of attack (FIG. 3a) resulting in upward vectoring of the thrust, and in FIG. 4, airfoils 33,34 are rotated in the other direction to a corresponding angle of attack (FIG. 4a), resulting in downward vectoring (FIG. 4b), without lateral vectoring (FIG. 3c,4c). In FIG. 5, airfoil 33 is rotated to a 90° angle of attack and airfoil 34 is streamlined (FIG. 5a), and in FIG. 6, airfoil 5c,6c) without vertical vectoring. It is noted that the airfoil orientations presented in FIGS. 2-6 depict the extremes of pure lateral or vertical vectoring resulting from particular airfoil 33,34 orientations. It is clear that intermediate orientations (angles of attack) will result in vectoring capability within a solid angle of up to about 60° defined about thrust axis T at discharge plane 31, and that vector direction can be changed by varying the angles of attack of the airfoils 33,34 independently. It is noted further that FIGS. 2-6 depict two airfoils disposed diametrically, which were shown to provide vectoring capability up to 30° with minimal loss of total thrust coefficient. Four airfoils disposed in quadrature around thrust axis T were examined but did not provide substantial advantage in total vectoring capability over the two diametrically disposed airfoils shown in the figures. It is noted, however, that the stability of nozzle 15 was improved somewhat with airfoils inserted as compared to the nozzle without the airfoils.

Referring again to FIG. 1, movement of airfoils 33,34 may be provided by motor means 37,38 disposed adjacent nozzle 15 and operatively connected to airfoils 33,34 by linkage means 40,41 by which airfoils 33,34 may individually be rotated and moved axially from a stored position within housing 17 to a selected extended position within exhaust duct 21. Axially movable airfoils provide an advantage that the airfoils may be withheld from exposure to the exhaust gases within duct 21 and extended when needed to provide the desired vectoring, provided that particular system allows partial or intermittent vectoring.

The invention described herein enjoys certain advantages over conventional systems comprising fluid injection, in that a single airfoil can be inserted to provide a desired vectoring direction, and the two airfoils may be extended to vector the thrust vertically, all without fluid injection. Suitable arrangements and control of the airfoils may also allow roll moments to be controllably generated.

The invention therefore provides a thrust vectoring nozzle structure incorporating small airfoils in the divergent portion of the nozzle exhaust duct for vectoring thrust. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. An exhaust nozzle for an engine which generates thrust by expulsion of gaseous products of fuel combustion, comprising:
    (a) a generally axisymmetric housing defined along a central thrust axis including a wall structure defining an exhaust duct, and axially adjacent radially inwardly convergent portion, throat portion and radially outwardly divergent portion; and
    (b) at least one airfoil sized to protrude into said exhaust duct a distance corresponding to about 15 to 35 percent of the diameter of said throat portion disposed within said divergent portion at a location axially spaced from said throat portion a distance corresponding to from 20 per cent to 25 per cent of the axial extent of said divergent portion, said airfoil mounted on said wall structure for rotation about an axis substantially perpendicular to said thrust axis.

2. The exhaust nozzle of claim 1 comprising two airfoils mounted diametrically of said divergent portion for rotation about respective substantially mutually coincident axes each perpendicular to said thrust axis.

3. The exhaust nozzle of claim 2 further comprising motor means and linkage means interconnecting said motor means and said airfoils for selectively rotating said airfoils and for selectively moving said airfoils along the respective axes of rotation thereof from a stored position within said housing to an extended position within said exhaust duct.

4. The exhaust nozzle of claim 1 further comprising a radially inwardly convergent reconvergent portion axially adjacent said convergent portion.

5. An exhaust nozzle for an engine which generates thrust by expulsion of gaseous products of fuel combustion, comprising:
    (a) a generally axisymmetric housing defined along a central thrust axis including a wall structure defining an exhaust duct, and axially adjacent radially inwardly convergent portion, throat portion, radially outwardly divergent portion, and radially inwardly convergent reconvergent portion; and (b) a pair of airfoils disposed within said divergent portion at a location axially spaced from said throat portion a distance corresponding to from 20 per cent to 25 per cent of the axial extent of said divergent portion, each of said airfoils being sized to protrude into said exhaust duct a distance corresponding to about 15 to 35 percent of the diameter of said throat portion, said airfoils mounted on said wall structure diametrically of said divergent portion for rotation about respective substantially mutually coincident axes each perpendicular to said thrust axis.

6. The exhaust nozzle of claim 5 further comprising motor means and linkage means interconnecting said motor means and said airfoils for selectively rotating said airfoils and for selectively moving said airfoils along the respective axes of rotation thereof from a stored position within said housing to an extended position within said exhaust duct.

* * * * *

UNITED STATES PATENT AND TRADEMARK OFFICE
CERTIFICATE OF CORRECTION

PATENT NO.  : 5,154,050
DATED       : October 13, 1992
INVENTOR(S) : Eric J. Herup et al It is certified that error appears in the above-identified patent and that said Letters Patent is hereby corrected as shown below:

On the Title page, item [57]
Abstract, line 8, "radically" should be --radially--.
Column 2, line 65, "fat" should be --flat--.
Column 3, line 32, a hyphen should follow "stream".
Column 3, line 33, "2c" should be --2a--.
Column 3, line 35, "33.34" should be --33,34--.
Column 3, line 44, --34 is rotated to a 90° angle of attack
    and airfoil 33 is streamlined, resulting in the corres-
    ponding lateral vectoring  (FIG-- should follow "airfoil".

Signed and Sealed this

Twenty-eighth Day of September, 1993

Attest:

BRUCE LEHMAN

Attesting Officer     Commissioner of Patents and Trademarks